(12) United States Patent
Bailey

(10) Patent No.: US 12,454,163 B2
(45) Date of Patent: Oct. 28, 2025

(54) DECOUPLING JOUNCE LOADS AND TORSION LOADS IN TWIST BEAM AXLES

(71) Applicant: Rivian IP Holdings, LLC, Plymouth, MI (US)

(72) Inventor: Timothy Peter Bailey, Yockleton (GB)

(73) Assignee: Rivian IP Holdings, LLC, Irvine, CA (US)

( * ) Notice: Subject to any disclaimer, the term of this patent is extended or adjusted under 35 U.S.C. 154(b) by 490 days.

(21) Appl. No.: 18/089,958

(22) Filed: Dec. 28, 2022

(65) Prior Publication Data

US 2024/0217267 A1 Jul. 4, 2024

(51) Int. Cl.
*B60G 21/055* (2006.01)
*B60B 35/14* (2006.01)
*B60G 21/05* (2006.01)

(52) U.S. Cl.
CPC ............ *B60G 21/051* (2013.01); *B60B 35/14* (2013.01); *B60G 2204/418* (2013.01)

(58) Field of Classification Search
CPC .............. B60G 21/055; B60G 21/0551; B60G 21/0553; B60G 21/0555; B60G 21/0556; B60G 21/0558
See application file for complete search history.

(56) References Cited

U.S. PATENT DOCUMENTS

| | | | | |
|---|---|---|---|---|
| 5,601,165 | A * | 2/1997 | Oppitz | F01C 9/002 92/125 |
| 7,837,202 | B2 * | 11/2010 | Taneda | B60G 21/0556 280/124.152 |
| 8,562,009 | B2 * | 10/2013 | Michel | B60G 17/025 280/124.137 |
| 8,827,287 | B2 * | 9/2014 | Michel | B60G 21/0555 280/5.507 |
| 11,280,376 | B2 * | 3/2022 | Baskin | B60G 17/0162 |
| 12,179,533 | B1 * | 12/2024 | Kim | B60G 21/026 |
| 12,220,964 | B2 * | 2/2025 | Lee | B60G 21/0556 |
| 12,319,109 | B2 * | 6/2025 | Lee | B60G 21/0556 |
| 2007/0290473 | A1 * | 12/2007 | Buma | B60G 17/0162 280/124.106 |
| 2008/0191430 | A1 * | 8/2008 | Grannemann | B60G 21/0556 280/5.511 |
| 2009/0224493 | A1 * | 9/2009 | Buma | B60G 17/0162 280/5.511 |
| 2013/0127131 | A1 * | 5/2013 | Michel | B60G 11/183 280/124.106 |
| 2021/0260953 | A1 * | 8/2021 | Graeuler | F16C 19/26 |
| 2021/0270343 | A1 * | 9/2021 | Battlogg | F16F 9/145 |
| 2024/0017602 | A1 * | 1/2024 | Remboski | B60B 35/14 |
| 2024/0262155 | A1 * | 8/2024 | Lee | B60G 21/0556 |

OTHER PUBLICATIONS

Wikipedia. "De Dion tube", this page was last edited on Nov. 6, 2022. Located at: https://en.wikipedia.org/wiki/De_Dion_tube, 4 pages.

* cited by examiner

*Primary Examiner* — Toan C To
(74) *Attorney, Agent, or Firm* — Patterson + Sheridan, LLP

(57) ABSTRACT

A vehicle includes an axle with an apparatus that includes a first cylinder, a bearing and a second cylinder positioned around the first cylinder and coaxial with the first cylinder. The bearing is positioned between the first and second cylinders, and the first and second cylinders rotate relatively about an axis and are fixed in a direction of the axis.

19 Claims, 12 Drawing Sheets

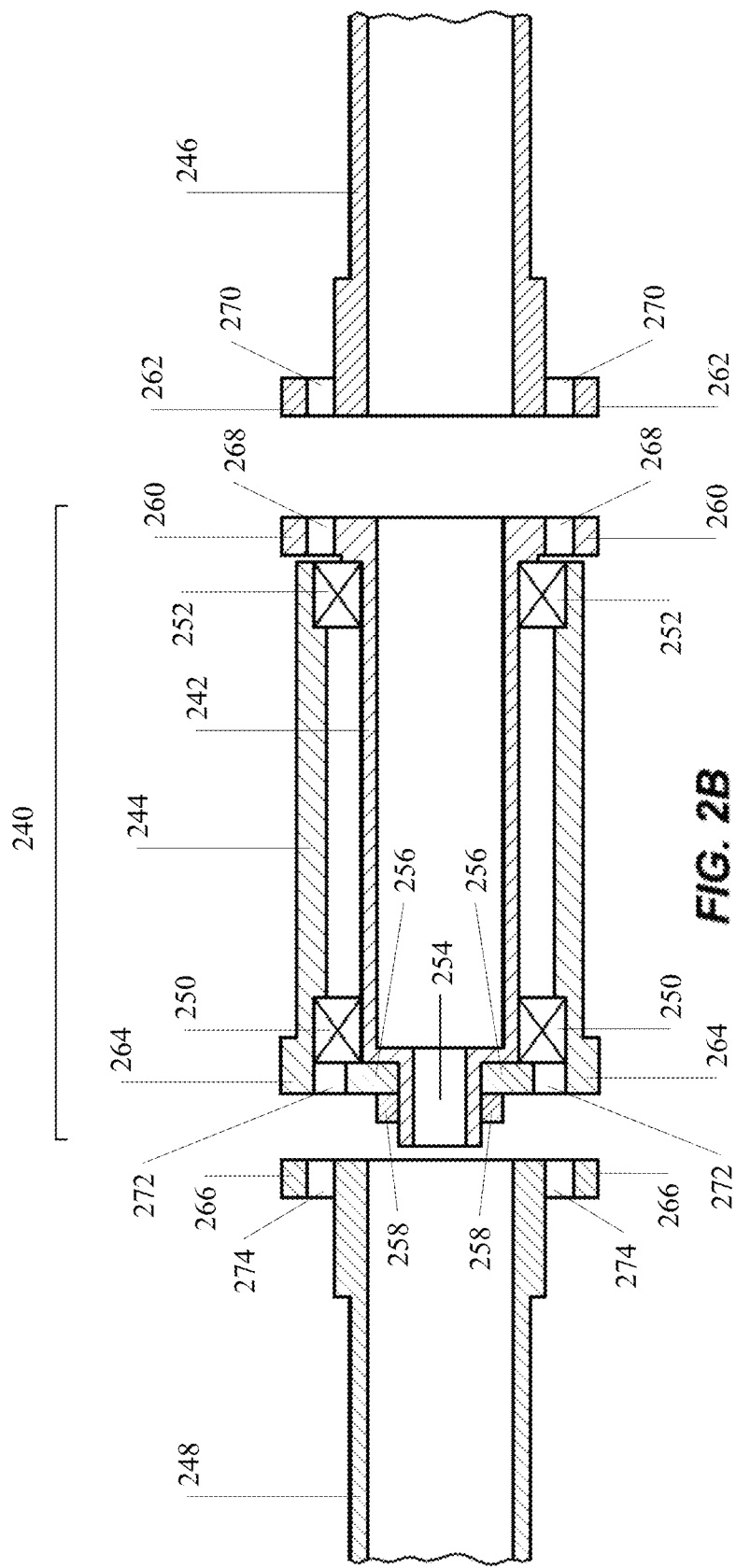

DECOUPLING JOUNCE LOADS AND TORSION LOADS IN TWIST BEAM AXLES

INTRODUCTION

Vehicle twist beam axles support vehicle weight vertically and connect vehicle wheels laterally. During vehicle motion, a twist beam axle is subjected to jounce loads and torsion loads. A jounce load, as used herein, is the force applied to the axle when both wheels connected to the axle travel in an upward direction, and may result in high bending moments in the axle. A torsion load is generated in the axle when one wheel travels in an upward direction while the other wheel travels in a downward direction. To operate effectively, a twist beam axle can be designed to withstand the stresses of both jounce loads and torsion loads.

BRIEF SUMMARY

Withstanding jounce loads and torsion loads requires incorporating competing characteristics. On one hand, to withstand jounce loads requires a twist beam axle to be sufficiently rigid while, on the other hand, the axle must be sufficiently flexible to prevent excessive torsion loads. Thus twist beam axles may be limited to applications where jounce and torsion loads remain below a specific threshold. The present disclosure introduces a rotating component that may be incorporated into a vehicle twist beam axle in order to decouple jounce and torsion loads that may act on the axle. Advantageously, embodiments described herein may allow the axle to support greater jounce loads without generating excessive torsion loads.

In some embodiments, the rotating component may include two cylinders with one cylinder positioned inside of the other. The rotating component may be incorporated into a vehicle axle to advantageously dissipate torsion loads through the relative rotation of the component's two cylinders. Further, the rotating component may simultaneously withstand jounce loads through the cylinder's capacity to support high bending moments. As a result, the rotating component may handle jounce and torsion loads with different mechanisms and thus help to decouple the jounce and torsion loads on the vehicle axle.

In various embodiments, a vehicle includes an axle with an apparatus that includes a first cylinder, a bearing, and a second cylinder positioned around the first cylinder and coaxial with the first cylinder. The bearing is positioned between the first and second cylinders, and the first and second cylinders rotate relatively about an axis and are fixed in a direction of the axis.

In various embodiments, the first cylinder includes a first attachment point for fixedly attaching to a first axle part, and the second cylinder includes a second attachment point for fixedly attaching to a second axle part.

In various embodiments, one of the first attachment point and the second attachment point includes an opening to position a fastener component.

In various embodiments, the first axle part includes the first cylinder or the second axle part includes the second cylinder.

In various embodiments, the second axle part is positioned at least partially around the first cylinder, the bearing is positioned between the first and second cylinders, and the apparatus further includes a second bearing positioned between the first cylinder and the second axle part at a distance from the bearing.

In various embodiments, the first axle part includes a third attachment point for attaching a first wheel, and the second axle part includes a fourth attachment point for attaching a second wheel.

In various embodiments, the bearing is positioned between the first and second cylinders, and the apparatus further includes a second bearing positioned between the first and second cylinders at a distance from the bearing.

In various embodiments, the bearing has a different structure than the second bearing.

In various embodiments, the first cylinder is tapered.

In various embodiments, the bearing includes a component for facilitating the rotation of the first and second cylinders.

In various embodiments, the bearing includes a third and fourth cylinder positioned around the component, the third cylinder is attached to the first cylinder and the fourth cylinder is attached to the second cylinder.

In various embodiments, a suspension system includes a first axle part including an attachment point on a first end for attaching to a first wheel. The suspension system further includes a second axle part including an attachment point on a first end for attaching to a second wheel. The suspension system further includes a first cylinder fixedly attached to a second end of the first axle part, a bearing, and a second cylinder positioned around the first cylinder and coaxial with the first cylinder. The bearing is positioned between the first and second cylinders, the first and second cylinders rotate relatively about an axis and are fixed in a direction of the axis, and the second cylinder is fixedly attached to a second end of the second axle part.

In various embodiments, the bearing is positioned between the first and second cylinders, and the suspension system further includes a second bearing positioned between the first and second cylinders at a distance from the bearing.

In various embodiments, the second axle part is positioned at least partially around the first cylinder, the bearing is positioned between the first and second cylinders, and the suspension system further includes a second bearing positioned between the first cylinder and the second axle part at a distance from the bearing.

In various embodiments, the bearing has a different structure than the second bearing.

In various embodiments, the first cylinder is tapered.

In various embodiments, the bearing includes a component for facilitating the rotation of the first and second cylinders.

In various embodiments, the bearing includes a third cylinder and a fourth cylinder positioned around the component, the third cylinder is attached to the first cylinder and the fourth cylinder is attached to the second cylinder.

In various embodiments, fixedly attaching the first cylinder to the first axle part includes bolting or welding the first cylinder to the first axle part, and fixedly attaching the second cylinder to the second axle part includes bolting or welding the second cylinder to the second axle part.

In various embodiments, the first axle part is positioned at least partially around the first cylinder.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2B illustrates a cross-sectional schematic of another example embodiment of a rotating component.

DETAILED DESCRIPTION

The present disclosure introduces a rotating component that may be incorporated into a vehicle twist beam axle to decouple jounce and torsion loads acting on the axle. The rotating component may include two cylinders, one inside the other. The two cylinders may share an axis that passes through both cylinders and the two cylinders may also be fixed in a direction of the shared axis. Bearings may be positioned between the two cylinders to facilitate relative rotation of the cylinders. The bearings may also be positioned at a distance from one another such that there is a certain amount of space between the bearings. In some embodiments, the bearings between the rotating component's two cylinders may be spaced from one another to advantageously increase the extent to which the two cylinders of the rotating component are able to bend in response to the jounce loads. Consequently, the rotating component may advantageously support high bending moments and withstand jounce loads. The rotating component may be incorporated into a vehicle axle by attaching, for example, axle parts to both sides of the rotating component. Since the rotating component's two cylinders may rotate relative to one another, the two axle parts also may rotate relative to one another, dissipating torsion loads introduced into the axle. As a result, the rotating component may handle jounce and torsion loads with different mechanisms and thus help to decouple the jounce and torsion loads on a vehicle twist beam axle.

Figure 1:
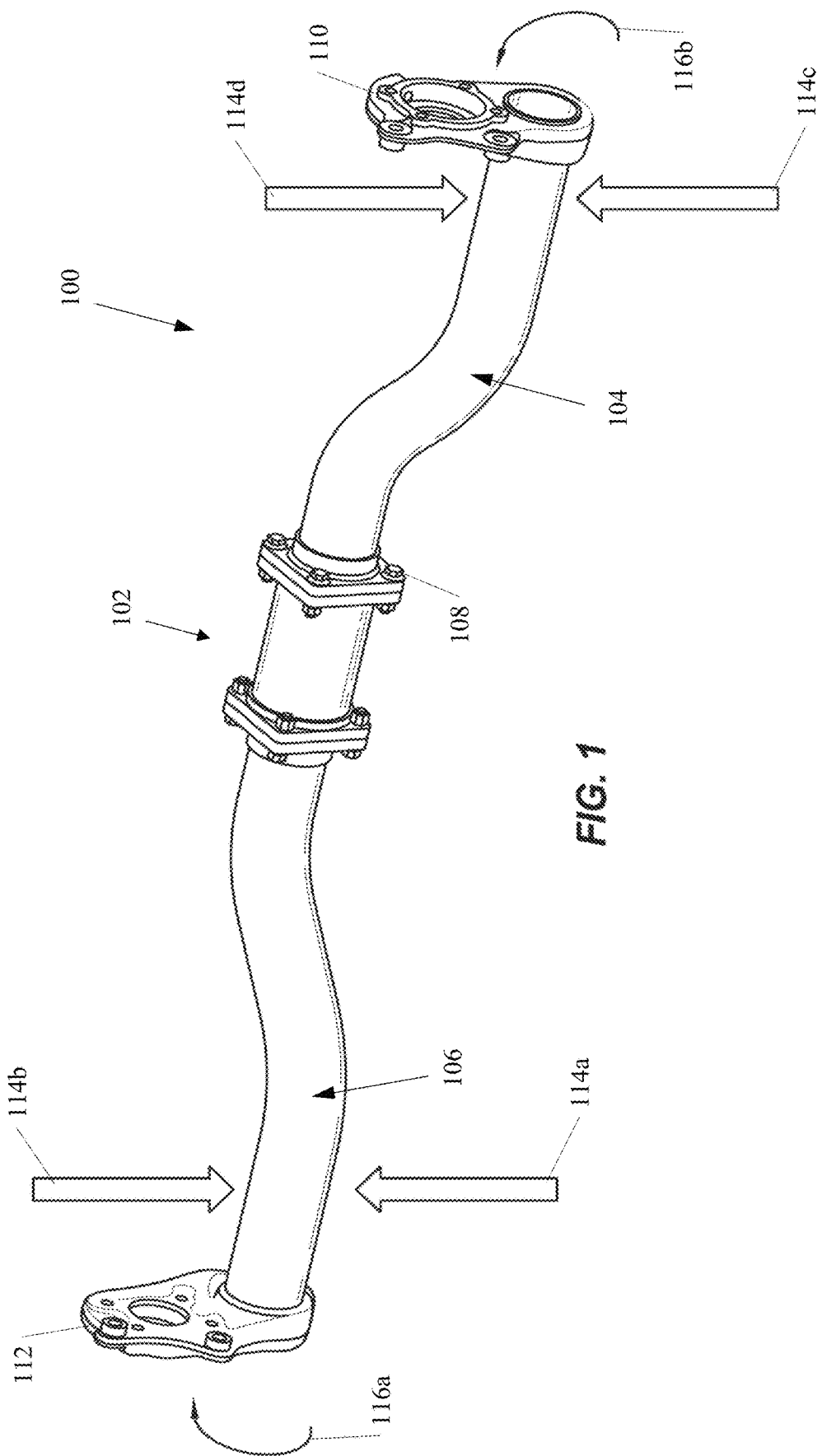
FIG. 1 illustrates an example application of a rotating component.

FIG. 1 illustrates an example application of a rotating component 102 incorporated into a vehicle axle 100, in accordance with various embodiment. In some embodiments, vehicle axle 100 may be used in a suspension system of a vehicle, but it will be appreciated that many other applications for the rotating component are appropriate. The rotating component 102 may be incorporated into a vehicle twist beam axle with axle parts 104 and 106 attached to the two ends of the rotating component 102. The axle parts 104 and 106 may also be aligned with the rotating component such that the shared axis that passes through the two cylinders of the rotating component also passes through the axle parts. In various embodiments, the shared axis may pass through the entirety of the axle parts, but in various other embodiments, the shared axis may only pass through a section of the axle parts starting from the end attached to the rotating component.

In some embodiments, the rotating component 102 may include a first cylinder (such as 202 shown in FIG. 2A and described below) and a second cylinder (such as 204 shown in FIG. 2A and described below) positioned around the first cylinder and coaxial with the first cylinder. In some embodiments, the first and second cylinders rotate relatively about an axis shared by the two cylinders and the cylinders are fixed in a direction of the axis. Advantageously, the two cylinders reduce the effects of forces that create jounce and torsion loads.

Vertical forces 114a and 114c, for example, may act on the vehicle axle from either end to produce jounce loads. When a vehicle travels over various road obstacles such as potholes, curbs, and bumps, the road obstacle may cause a vehicle's wheel to travel upwards, resulting in an upwards vertical force acting on the vehicle axle. After the vehicle's wheel reaches the end of its upward travel, the wheel may travel in a downward direction, resulting in downwards vertical forces 114b and 114d, for example, to act on the vehicle axle. Additionally, rotational forces 116a and 116b may result when the vertical forces acting on either end of the axle are in opposite directions. For example, the combination of an upward vertical force 114a on one end of the axle with a downward vertical force 114d on the other end of the axle may result in rotational forces 116a and 116b that rotate in opposite directions to produce torsional loads on the vehicle twist beam axle. In the presence of such jounce and torsion loads, the rotating component may advantageously decouple the jounce and torsion loads by enabling the axle parts 104 and 106 attached to the rotating component 102 to rotate relatively and thereby dissipate the torsion loads while still withstanding the jounce loads. This may be achieved as the axle parts 104 and 106 may be attached to the first and second cylinders of the rotating component, and with the first and second cylinders rotating relatively about an axis, the axle parts 104 and 106 may similarly rotate relatively, and thus dissipate the torsion load. At the same time, the first and second cylinders may support high bending moments capable of withstanding jounce loads, as described further below.

In the example application, axle parts 104 and 106 may be attached to the rotating component 102 using bolts or screws 108, however, various other applications may attach the axle parts by welding them to the rotating component such that the vehicle axle acts as one continuous structure. The axle parts 104 and 106 may also be straight or include any number of bent portions. In various embodiments, the axle parts 104 and 106 including bent portions that may allow an independent drive motor to be attached to the axle parts 104 and 106 when the vehicle axle 100 is implemented as the rear axle for a vehicle. This may in turn allow the vehicle axle 100 with the rotating component 102 to be incorporated into vehicles that provide torque to the vehicle's rear wheels, such as in four-wheel-drive (4WD) vehicles.

Axle parts 104 and 106 may also include attachment points 110 and 112 respectively for fixedly attaching to wheels. Specifically, the axle parts may include attachment points such as 110 and 112 with openings for inserting a shaft that may in turn be attached to the hub of a wheel. Alternatively, the attachment points 110 and 112 may fixedly attach to the wheels of a vehicle, and thus include a mechanical spindle for inserting into the hub of a wheel. In other words, a first axle part 104 may include an attachment point 110 on a first end for attaching to a first wheel of a vehicle, and a second axle part 106 may include an attachment point 112 on a first end for attaching to a second wheel of a vehicle. The first cylinder of the rotating component 102 may fixedly attach to a second end of the first axle part 104, and the second cylinder of the rotating component 102 may fixedly attach to a second end of the second axle part 106. In some embodiments, the attachment points 110 and 112 may include a motor specifically for supplying power to a wheel that may be attached to the attachment point.

Figure 2A:
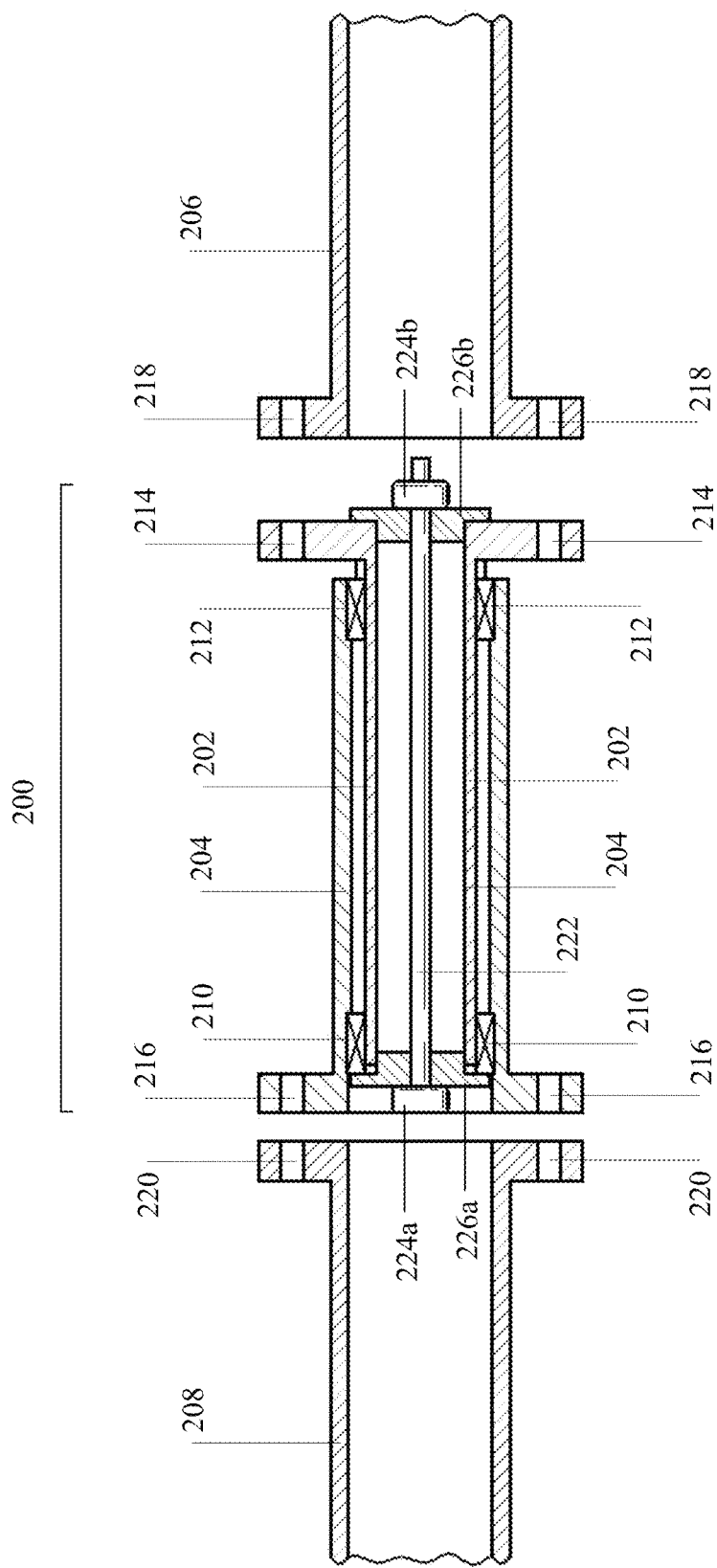
FIG. 2A illustrates a cross-sectional schematic of an example embodiment in a rotating component.

FIG. 2A illustrates a cross-sectional schematic of an example embodiment of a rotating component 200. In some embodiments, rotating component 200 is rotating component 102 of FIG. 1. The rotating component 200 may include a first cylinder 202 and a second cylinder 204 that is positioned around the first cylinder 202. The rotating component 200 may further include bearings 210 and 212 positioned between the first cylinder 202 and the second cylinder 204 to facilitate relative rotation of the first 202 and second 204 cylinders. For example, the bearings 210 and 212 may facilitate rotation of the first cylinder 202 in a first direction while keeping the second cylinder 204 stationary relative to the first cylinder; the bearings 210 and 212 may also facilitate rotation of the second cylinder 204 in a second direction that is opposite of the first direction in which the first cylinder 202 may be rotating, resulting in the first 202 and second 204 cylinders rotating in opposite directions relative to one another. The relative rotation of the first 202 and second 204 cylinders may transfer the torsion load to the bearings 210 and 212 and thus dissipate the torsion load. On the other hand, the bearings 210 and 212 being positioned at a distance from each other may allow the first and second cylinders of the rotating component to support high bending moments and thus withstand jounce loads. As a result, the rotating component may handle jounce and torsion loads using different mechanisms and thus decouple jounce and torsion loads.

The first 202 and second 204 cylinders may also be fixed in a direction of the shared axis. In other words, translational movement of the first and second cylinders relative to each other along the shared axis may be restricted. For example, the relative position of either of the cylinders on the shared axis may not change without the position of the other cylinder changing in the same manner. This way, any movement along the shared axis may be movement of the entire rotating component along the shared axis. In the schematic of FIG. 2A, this may mean that the first cylinder 202 may not move toward the left or right without the second cylinder 204 also moving in the same direction. Restricting the cylinders' movement in this way may help prevent the cylinders from sliding out of the depicted configuration, thereby reducing the risk that the rotating component disassembles during operation or that the rotating component's ability to decouple jounce and torsion is reduced.

Axle parts 206 and 208 may be fixedly attached to the first 202 and second 204 cylinders, respectively. Once attached, the relative rotation of the first and second cylinders may extend to axle parts 206 and 208, thus allowing the axle parts 206 and 208 to also rotate relative to one another. As a result, the relative rotation of the axle parts 206 and 208 via the first 202 and second 204 cylinders of the rotating component 200 may dissipate torsion loads that may act on the axle parts and/or the rotating component. In various embodiments, axle parts 206 and 208 may correspond to axle parts 104 and 106 of FIG. 1.

Although the rotating component in FIG. 2A is illustrated with two bearings, various embodiments may include fewer or more bearings. The bearings may be mechanical components positioned between the first 202 and second 204 cylinders that facilitate rotational movement of the cylinders relative to one another. In other words, the bearings may facilitate one of the two cylinders rotating in a clockwise manner while the other cylinder remains stationary or rotates in a counter-clockwise manner, if viewed from the left of FIG. 2A for example.

In various embodiments, the bearings 210 and 212 may also help fix the first and second cylinders 202 and 204 in a direction of the shared axis by restricting translational motion from the first and second cylinders, at least relative to each other and the bearings, which may be achieved in various ways. For example, the friction between the inner rings of the bearings and the first cylinder may be high enough to only allow very little, if any, translational motion from the first cylinder. As a result, this may restrict the first cylinder from sliding back and forth through the bearings' central openings and potentially even slide out of the bearings altogether. The bearings may be configured to securely fit the first cylinder in order to achieve the friction necessary to restrict translational motion of the first cylinder. For example, the first cylinder may initially be loosely inserted through the central openings of the bearings, but the diameters of the bearings may then be reduced such that they securely fit the first cylinder. This may be achieved, for example, by having screws on the bearings that may be tightened to reduce the diameter of the bearings. The screws may initially be loosened to insert the first cylinder through the bearings' central openings, and then subsequently tightened to secure the bearings to the first cylinder. Various embodiments may also use other approaches to securely fit the first cylinder into the central openings of the bearings. For example, the bearings may be mounted using techniques such as press fitting or shrink fitting the bearing onto the cylinder. The specific technique used to mount the bearings may consider that the more accurately the bearings are mounted, such as the closer the bearings are mounted at right angles to the first cylinder 202, the axle and rotating component 200 may provide, when incorporated into a vehicle, better toe and camber control. Additionally, fasteners may also be used to secure the first cylinder to the bearing and restrict translational motion along the shared axis, thus helping to fix the first cylinder in a direction of the shared axis. In various embodiments, the bearings may also be preloaded in order to ensure adequate contact with the first cylinder. The specific preload may be adjusted as appropriate for various applications, but consideration may be given that increasing preload may eventually lead to increased friction between the bearings and the first cylinder 202 that may damage the components and reduce operable lifetime. However, sufficient preload may be required to prevent the first cylinder 202 from sliding out of the bearings 210 and 212. Since the bearings may be positioned between the first and second cylinders, the second cylinder may be in contact with the exterior of the bearings' outer rings. The second cylinder may thus be secured to the bearings' outer rings, which may be achieved in various manners similar to how the bearings are secured to the first cylinder. As a result, the first and second cylinders may rely on being secured to the bearings and the bearings' structure to restrict translational motion along the shared axis while still enabling the cylinders to be relatively rotatable.

The bearings may have a circular shape and may be positioned at some distance from one another. For example, in various embodiments with two bearings, such as the exemplary embodiment illustrated in FIG. 2A, the bearings may be positioned at the ends of the first cylinder, or at the ends of the section of the first cylinder that may be positioned inside the second cylinder. More generally, the bearings may be positioned between the first and second cylinders at particular locations so as to avoid a section where a bending moment caused by a jounce load is greatest so that the cylinders are able to support the bending moment. However, the specific distance between the bearings may depend on a variety of factors in various embodiments, such as the magnitude of the jounce load experienced by the first and second cylinders, or the size of the bearings, among many others.

In various embodiments, the bearings may include multiple components. For example, the bearings may include an inner ring and outer ring with a rolling element between the inner and outer rings. The rolling element may refer to a variety of different elements, such as balls, cylindrical rollers, spherical rollers, tapered rollers, or needle rollers, among many others. The inner and outer rings may rotate along the rolling element, or one of the rings may rotate along the rolling element while the other is held stationary. Thus, the rolling element may facilitate the rotation of the inner and outer rings relative to one another. The bearings may also include a plurality of rolling elements, and thus the bearings may further include a cage between the inner and outer rings to prevent the rolling elements from coming into contact with one another. The surfaces of the inner and outer rings that come in contact with the rolling element may be lubricated in order to reduce the friction between those components. The inner ring may also include a central opening that the first cylinder may be positioned into. The first cylinder, after being positioned through the central opening, may then be positioned inside of the second cylinder, resulting in the bearings being positioned between the first and second cylinders. The first cylinder of the rotating component may then be secured to the inner ring while the second cylinder of the rotating component may be secured to the outer ring, as discussed further below. With the rolling element facilitating the rotation between the inner and outer rings, the cylinders being secured to the inner and outer rings may in turn mean that the rolling element also facilitates the rotation of the cylinders relative to one another. As such, the inner and outer rings of the bearings may be a third and fourth cylinder positioned around the component facilitating rotation, with the third cylinder (or inner ring) attached to the first cylinder while the fourth cylinder (outer ring) is attached to the second cylinder. The rolling element facilitating rotation of the inner and outer rings relative to one another may thus mean the rolling element is the component facilitating the rotation of the first and second cylinders. Various bearings may be used in various embodiments, such as plain bearings, ball bearings, needle roller bearings, etc. Various embodiments may also use combinations of different bearings, such as a combination of a ball bearing and a needle roller bearing.

The first cylinder 202 of the rotating component 200 may also include openings 214 aligned with openings 218 on an axle part 206. A bolt or screw, such as 108 of FIG. 1, may then be inserted through the openings 214 and 218 in order to fixedly attach the first cylinder 202 and the axle part 206. Similarly, the second cylinder 204 may include openings 216 that may be aligned with openings 220 on another axle part 208 such that another bolt or screw may be inserted through them to fixedly attach the second cylinder 204 and the axle part 208.

The rotating component may also include a rod 222 positioned through the first cylinder 202 that extends the entire length of the first cylinder. The rod 222 may be secured in place with fasteners 224a and 224b. Washers 226a and 226b may also be positioned to the right and left of the fasteners 224a and 224b, respectively. Besides relieving friction and preventing loosening of the fasteners 224a and 224b, the washer 226a may also help fix the first cylinder 202 in a direction of the shared axis. The washer 226a may be secured in place due to the fastener 224a, and because the width of the washer 226a may cause the washer to rest against the left end of the first cylinder 202 and the bearing 210, the washer 226a may act as a barrier preventing the first cylinder 202 from sliding to the left.

In various embodiments, the axle parts 206 and 208 may also help fix the first and second cylinders 202 and 204 in a direction of the shared axis that may pass through the centers of both cylinders. Specifically, the axle parts may themselves be secured to other sections of a broader system, which may restrict the axle parts' movement in a direction of the shared axis. For example, while each of the axle parts may be attached to the rotating component on one end, the axle parts may be attached to the wheels of a vehicle on the other end. The wheels may then act as barriers restricting the axle parts from moving along the shared axis, which consequently, may also restrict the first and second cylinders of the rotating component from moving along the shared axis. Additionally, the axle parts may be secured to a vehicle body through a pair of trailing arms fixedly attached to each of the axle parts. With the vehicle body as an anchor, the trailing arms may secure the axle parts in a direction the shared axis at least relative to the vehicle body. Consequently, the first and second cylinders of the rotating component, from being fixedly attached to the axle parts, may also be fixed in a direction of the shared axis as a result.

In various embodiments, the first and second cylinders of the rotating components described herein may include a hollow body, where the cylinders are completely hollow along their lengths. In various other embodiments, the first cylinder 202 may not be hollow and is instead a solid body, but the second cylinder 204 may remain hollow in order for the first cylinder to be positioned inside. The cylinders may also include a circular cross-section, however, various embodiments of the rotating component may also include cylinders with non-circular cross-sections, such as a square or oval cross-section. Additionally, the first and second cylinders of the rotating component may have different cross-sections.

In various embodiments, the first cylinder may be positioned inside of the second cylinder by inserting the first cylinder into the hollow body of the second cylinder. This may mean that the width of the second cylinder is greater than that of the first cylinder. Additionally, the difference in width between the first and second cylinders may need to be greater than some threshold value such that the first and second cylinders are able to retain their rotational freedom and remain relatively rotatable. Additionally, the difference in width between the two cylinders may need to be large enough that a mechanical bearing may be positioned between them to facilitate their relative rotation, as discussed further below.

In the example embodiment, the first cylinder 202 may be mostly positioned inside of the second cylinder 204 with some of the first cylinder remaining outside of the second cylinder, but in various other embodiments, the first cylinder 202 may be entirely positioned inside of the second cylinder 204. In various embodiments, the first cylinder and second cylinder share a common axis and thus are coaxial. In other words, the rotational axis of the first and second cylinders are coincident. The second cylinder 204 may have a larger width and thus surround the first cylinder 202, but the two cylinders may nonetheless remain coincident. The shared axis may also extend along the entire length of the two cylinders, or at least along the length of the two cylinders where the first cylinder is positioned inside of the second cylinder.

The cylinders of the rotating component may be constructed of various materials. For example, steel may be used to construct the cylinders in some embodiments, but aluminum may also be used in other embodiments, which may lead to weight savings. Additionally, the first and second cylinders may be constructed of the same material or different materials.

In various embodiments, the first and second cylinders 202 and 204 may be independent cylinders that are separate from the axle parts 206 and 208. In other words, the rotating component may include the first cylinder 202 positioned inside of the second cylinder 204, with the axle parts 206 and 208 as separate components, such as of an automobile suspension system, that may then be attached to the first and second cylinders of the rotating element, such as with bolts or screws. However, in various other embodiments, the first and second cylinders 202 and 204 of the rotating component and the axle parts 206 and 208 that are attached to the rotating component may be the same. Specifically, the first cylinder 202 may be an extension of a first axle part 206, while the second cylinder may be an extension of a second axle part 208, or both. In other words, the first axle part 206 may encompass the first cylinder 202, or the second axle part 208 may encompass the second cylinder 204, or both. In such embodiments, the rotating component may instead include a first axle part 206 that is partially positioned inside of a second axle part 208. However, in other embodiments, only one of the cylinders of the rotating component may be an axle part. Specifically, one of the rotating component's two cylinders may be an extension of an axle part, while the other of the two cylinders may be an independent component separate from an axle part. For example, the first cylinder 202 may be an independent cylinder that is a separate component from the first axle part 206, while the second cylinder 204 may include the second axle part 208 or may be an extension of the second axle part 208. In this case, the first cylinder 202 may be positioned inside the second axle part 208 that is the second cylinder. Alternatively, the first cylinder 202 may include the first axle part 206 or may be an extension of the first axle part 206, while the second cylinder 204 may be an independent cylinder separate from the second axle part 208. In this case, the first axle part 206 may take the role of the first cylinder and be positioned inside of the second cylinder 204 which may subsequently be attached to the second axle part 208.

As mentioned above, the first 202 and second 204 cylinders may include openings 214 and 216, respectively. The openings 214 of the first cylinder 202 may be aligned with the openings 218 of a first axle part 206 so that a bolt or screw (such as 108 of FIG. 1) may be inserted through both openings to fixedly attach the first cylinder 202 to the axle part 206. Similarly, the openings 216 of the second cylinder 204 may be aligned with the openings 220 of a second axle part 208 so that another bolt or screw may be inserted through the openings to fixedly attach the second cylinder 204 to the axle part 208. In various embodiments, the openings 214 of the first cylinder 202 may also be considered attachment points for fixedly attaching to the axle part 206, and openings 216 of the second cylinder 204 may also be considered attachment points for fixedly attaching to the axle part 208. As such, the first cylinder 202 may include a first attachment point 214 for fixedly attaching to the first axle part 206, and the second cylinder may include a second attachment point 216 for fixedly attaching to the second axle part 208. The openings 214, 216, 218, and 220 may take various shapes in various embodiments depending on the bolt, screw, or other fastener component that is used to fixedly attach the cylinders to the axle parts. Different openings may also take different shapes, which may allow different fasteners to be used in a given embodiment. Additionally, various embodiments may only include some of the openings. For example, the openings 214 of the first cylinder 202 and the openings 218 of the axle part 206 may be included in an embodiment such that a fastener may be used to fixedly attach the first cylinder 202 and axle part 206, but the same embodiment may not include openings 216 and 220 since the second cylinder 204 may instead be welded to the axle part 208.

As mentioned earlier, in various embodiments, the rotating component may be incorporated into a vehicle twist beam axle structure with axle parts 206 and 208 attached to either side of the rotating component. In the application of a vehicle axle, the axle parts may have originally formed a single continuous vehicle axle, but became separate axle parts with the introduction of the rotating component. In various embodiments, an axle part may be a rod, shaft, tube, cylinder, or other similar component that may support the weight of a vehicle and connect a pair of wheels. In various embodiments, the axle parts 206 and 208 may be of roughly equal length, which may result in the rotating component being positioned close to or at the center of the vehicle axle structure comprising at least the axle parts and the rotating component. In various other embodiments, the rotating component may not be located at or near the center of the vehicle axle structure if the axle parts are of different lengths. More generally, various applications of the rotating component into a vehicle axle structure may incorporate the rotating component at various locations, with the axle parts of the vehicle axle that are attached to either side of the rotating component possibly being various different lengths. When attaching to the rotating component, a first axle part 206 may fixedly attach to the first cylinder 202, while a second axle part 208 may fixedly attach to the second cylinder 204. To fixedly attach the axle parts to the first and second cylinders, various embodiments may use various methods to secure the axle parts to the cylinders, such as bolting or screwing the axle parts to the cylinders, welding the axle parts to the cylinders, or any other appropriate method. Although the axle parts may be explained in the context of a vehicle axle, in various embodiments, the axle parts may refer to any components that connect the rotating component to a broader system.

As described herein, the rotating component 200 may include a first cylinder 202 positioned inside of a second cylinder 204, where the cylinders may rotate relatively about a shared axis. The first 202 and second 204 cylinders may also be fixed in a direction of the shared axis to prevent the cylinders from sliding and potentially causing the rotating component to disassemble. Bearings 210 and 212 may be positioned between the first 202 and second 204 cylinders in order to aid in that aspect while also facilitating the relative rotation between the first and second cylinders. The rotating component may also be incorporated into a vehicle axle structure, where axle parts 206 and 208 may be attached to either side of the rotating component. Specifically, a first axle part 206 may be fixedly attached to the first cylinder 202 while a second axle part 208 may be fixedly attached to the second cylinder 204. When one vehicle wheel moves upward while another vehicle wheel moves downward, the resulting torsion load may be dissipated by the rotating component 200 through the relative rotation of the first 202 and second 204 cylinders. In comparison, an axle without the rotating component may instead retain the torsion load in the axle itself and rely on the flexibility of the axle to withstand the torsion load. Additionally, the bearings 210 and 212 between the cylinders of the rotating component may be positioned at a distance apart from one another in order for the rotating component to support high bending moments. As a result, the rotating component may also withstand the jounce loads that are produced when one or both of the vehicle wheels travels upward. This means that the rotating component may handle jounce and torsion loads with different mechanisms and thus help to decouple jounce and torsion loads that act on a vehicle axle. Various embodiments of the rotating component may also connect an electronic computing unit to the rotating component in order to monitor the component and ensure that the component remains securely assembled or that the component is still adequately performing its intended functions, among many other potential uses.

FIG. 2B illustrates a cross-sectional schematic of another example embodiment of a rotating component 240. Similar to the embodiment illustrated in FIG. 2A, the rotating component 240 may include a first cylinder 242 and a second cylinder 244, where the first cylinder 242 may be positioned inside of the second cylinder 244. The rotating component may further include bearings 250 and 252 positioned between the first 242 and second 244 cylinders to facilitate relative rotation between the first and second cylinders. The bearings 250 and 252 may be secured to the first 242 and second 244 cylinders in order to prevent the cylinders from sliding out of position and potentially causing the rotating component to disassemble. Axle parts 246 and 248 may then attach to either side of the rotating component, where a first axle part 246 may fixedly attach to the first cylinder 242 while a second axle part 248 may fixedly attach to the second cylinder 244. In this example embodiment, the first cylinder 242 may include a narrower section 254 at one end with a smaller width than the rest of the first cylinder. A washer 256 and fastener 258 may be positioned around the narrower section 254 to secure the first cylinder 242 in place. Similar to the washer 226a of FIG. 2A, the width of the washer 256 may cause the washer to rest against the wider section of the first cylinder and the bearing 250. This may allow the washer 256 to act as a barrier that prevents movement of the first and second cylinders relative to each other along the shared axis and further help fix the first and second cylinders in a direction of the shared axis. In various embodiments, the first cylinder 242 of FIG. 2B may correspond to the first cylinder 202 of FIG. 2A, while the second cylinder 244 of FIG. 2B may correspond to the second cylinder 204 of FIG. 2A. Similarly, the bearings 250 and 252 of FIG. 2B may correspond to the bearings 210 and 212 of FIG. 2A, while the axle parts 246 and 248 of FIG. 2B may correspond to the axle parts 206 and 208 of FIG. 2A.

Additionally, the first 242 and second 244 cylinders may include various attachment points for fixedly attaching to the axle parts 246 and 248. For example, the first cylinder 242 may include attachment points 260 that may be welded to section 262 of the first axle part 246, while the second cylinder 244 may include attachment points 264 that may be welded to section 266 of the second axle part 248. Alternatively, or additionally, the openings 268 of the first cylinder 242 may be aligned with the openings 270 of the first axle part 246, where a fastener such as a bolt or screw may then be inserted to fixedly attach the cylinder 242 and axle part 246. Similarly, the openings 272 between the second cylinder 244 and the washer 256 may be aligned with the openings 274 of the second axle part 248, where a fastener such as a bolt or screw may then be inserted. In various other embodiments, however, the attachment points 264 of the second cylinder 244 may be inserted into the openings 274 of the second axle part 248. The attachment points 264 may then be secured to the openings 274 using any appropriate method, such as using a bolt or screw. In such cases, the bolt or screw may be positioned orthogonally to the attachment point 264 as shown in FIG. 2C instead of laterally through the opening 274.

Figure 2C:
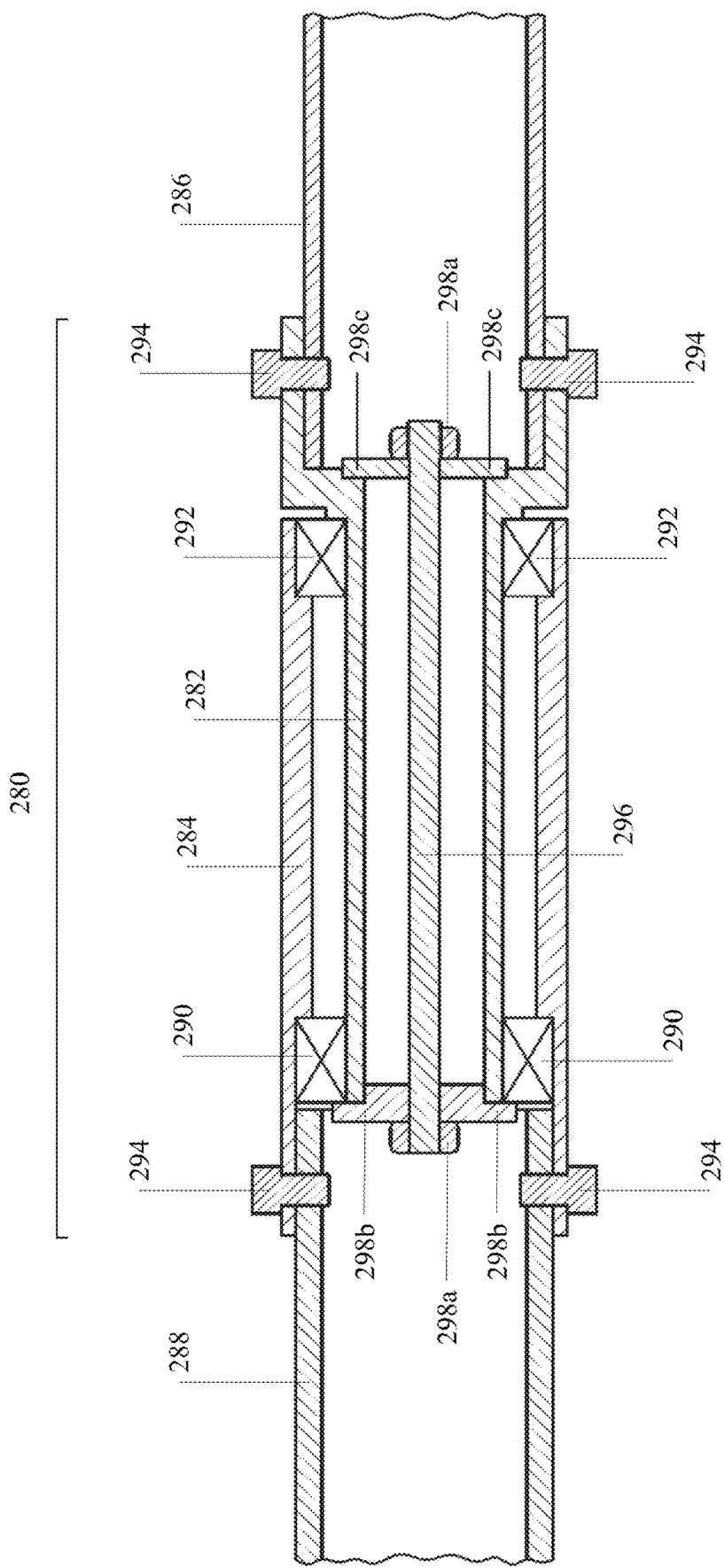
FIG. 2C illustrates a cross-sectional schematic of a third example embodiment of a rotating component.

FIG. 2C illustrates a cross-sectional schematic of a third example embodiment of a rotating component 280 which has been attached to axle parts. Similar to the embodiments illustrated in FIGS. 2A and 2B, the rotating component 280 may include a first cylinder 282 and a second cylinder 284, where the first cylinder is positioned at least partially inside of the second cylinder. The rotating component may further include bearings 290 and 292 positioned between the first 282 and second 284 cylinders to facilitate relative rotation between the first and second cylinders. Axle parts 286 and 288 may then attach to either side of the rotating component, where a first axle part 286 may fixedly attach to the first cylinder 282 and a second axle part 288 may fixedly attach to the second cylinder 284. As mentioned earlier, fixedly attaching the axle parts to the cylinders may be done using screws 294. While the bolts or screws may be positioned through the openings in the axle parts and cylinders and are thus parallel to them in the embodiments of FIGS. 2A and 2B, the screws 294 in the embodiment of FIG. 2C may be positioned orthogonally to the cylinders and axle parts. For the screws 294 to fixedly attach the cylinders and axle parts while being positioned orthogonally to the cylinders and axle parts, the cylinders may need to be positioned inside the axle parts as shown in FIG. 2C, or alternatively, the axle parts may need to be positioned inside the cylinders. In various embodiments, the first cylinder 282 of FIG. 2C may correspond to the first cylinder 202 of FIG. 2A or first cylinder 242 of FIG. 2B, while the second cylinder 284 of FIG. 2C may correspond to the second cylinder 204 of FIG. 2A or second cylinder 244 of FIG. 2B. Similarly, the bearings 290 and 292 of FIG. 2C may correspond to the bearings 210 and 212 of FIG. 2A or the bearings 250 and 252 of FIG. 2B, while the axle parts 286 and 288 of FIG. 2C may correspond to the axle parts 206 and 208 of FIG. 2A or 246 and 248 of FIG. 2B.

Similar to the rotating component 200 of FIG. 2A, the rotating component 280 may also include a rod 296 positioned through the first cylinder 282 that extends the entire length of the first cylinder, and secured in place with fasteners 298a and washers 298b and 298c. Like the washer 226a of the rotating component 200, the washers 298b may also act as a barrier to prevent the first cylinder 282 from sliding to the right. It may be noted that the second axle part 288 may not come in contact with the washer 298b. Since the washer 298b may be secured to the first cylinder 282, it may rotate in the same relative direction as the first cylinder. However, the second axle part 288 may be attached to the second cylinder 284 which may rotate in a different direction relative to the first cylinder. As a result, the washer 298b and second axle part 288 may also rotate in different directions relative to one another. As a result, if the two components were to be in contact, then the friction between the washer and second axle part due to the relative rotation may ware down the washer and potentially loosen the first cylinder 282 and rod 296. Then, the first cylinder may no longer be secured in place and fixed in a direction of the shared axis. The first cylinder may then potentially slide out of the bearings 290 and 292, and may cause the rotating component to disassemble.

Figure 3A:
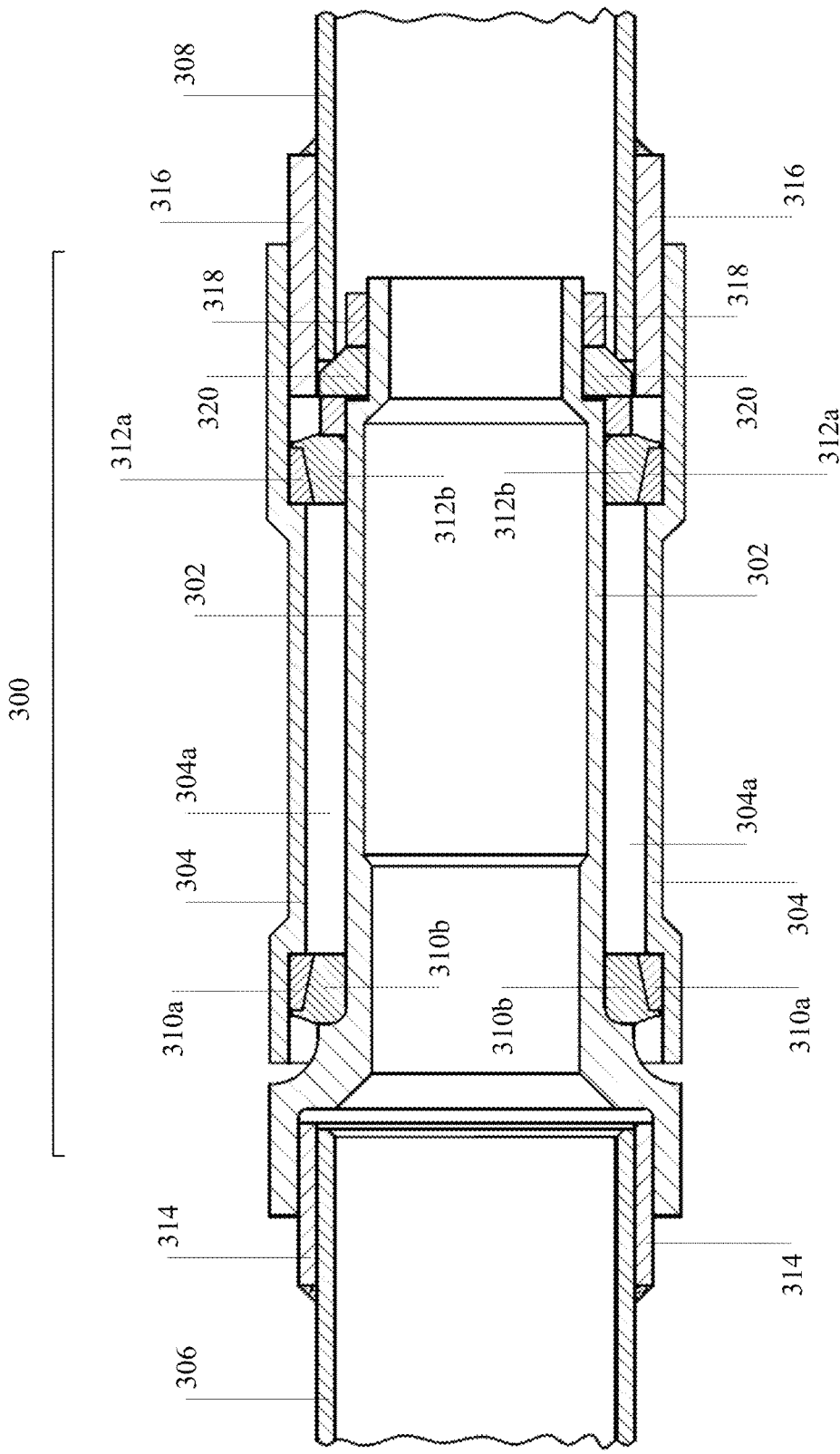
FIG. 3A illustrates a cross section of a fourth example embodiment of a rotating component.

FIG. 3A illustrates a cross section of a fourth example embodiment of a rotating component 300. The exemplary rotating component may include a first cylinder 302 that is positioned at least partially inside of a second cylinder 304. The hollow body 304a of the second cylinder may be greater than the width of the first cylinder which allows the first cylinder to be positioned inside of the second cylinder. Additionally, the first cylinder may also be positioned at least partially around a first axle part 306. The rotating component may also include bearings positioned between the first 302 and second 304 cylinders that may facilitate the relative rotation between the cylinders. A first bearing may include a first ring 310a and a second ring 310b, both positioned around the first cylinder 302. The bearing's first ring 310a may be positioned around the exterior of the second ring 310b, and a low coefficient of friction may be maintained between the two rings such that relative rotation between the two rings is supported. This way, when the first cylinder 302 rotates relative to the second cylinder 304 as a result of a torsion load, the first 310a and second 310b rings of the bearing may also rotate relatively in order to dissipate the torsion load. The contact surface between the first 310a and second 310b ring may also be at tilted at an angle from the horizontal, which may help the bearing support various bending moments that result from jounce loads. Similar to the first bearing, a second bearing may also include a first ring 312a and a second ring 312b. The first ring 312a may be positioned around the exterior of the second ring 312b and a low coefficient of friction may be maintained between the two rings so relative rotation between the rings is supported. The contact surface between the rings 312a and 312b may also be tilted at an angle from the horizontal to support bending moments that result from jounce loads.

The first cylinder 302 may be fixedly attached to the first axle part 306 by being welded to the first axle part. Similarly, the second cylinder 304 may also be fixedly attached to a second axle part 308 by being welded to the second axle part. In the example rotating component 300, there may also be an additional cylinder 314 positioned between the first cylinder 302 and the first axle part 306 such that the first cylinder 302, the cylinder 314, and the first axle part 306 form a threaded surface. Similarly, an additional cylinder 316 may be positioned between the second cylinder 304 and the second axle part 308 such that the second cylinder 304, the cylinder 316, and the second axle part 308 also form a threaded surface.

As described above with respect to FIG. 2A, the first cylinder 302 may rotate relative to the second cylinder 304 due to the bearings formed by 310a and 310b as well as 312a and 312b. By extension, the first axle part 306 and the second axle part 308 may also rotate relative to one another by being fixedly attached to the first and second cylinders of the rotating component. For example, if the first axle part is to rotate in a first direction, such as due to torsion loads from a wheel connected to the first axle part going into jounce, the first cylinder 302 may also rotate in the same direction due to the rotational freedom facilitated by the bearings. The bearings may then bear the rotational load from the first cylinder 302 and first axle part's 306 rotation. As a result, the second axle part 308 may not rotate with the first axle part and may instead stay stationary, may rotate in the opposite direction as the first direction, or may rotate the same direction but to a different angle as the first axle part. As such, in this scenario, the first 306 and second 308 axle parts may rotate relatively to one another to dissipate a torsion load that may have been applied to the axle.

Additionally, a section of the first cylinder may be positioned inside of the second axle part 308, similar to 254 of FIG. 2B. Although this configuration may naturally be the case in various embodiments where the second cylinder is an extension of the second axle part, it may also be the case when the second cylinder and second axle part are separate components. A fastener 318, such as a lock nut, and a washer 320 may be positioned around the section of the first cylinder positioned in the axle part in order to further fix the first cylinder in a direction of the shared axis. The fastener 318 may also provide a bearing preload in the rings 312a and 312b. In various embodiments, a separate bearing may also be positioned between the first cylinder and the second axle part in place of the fastener 318 and washer 320. The section of the first cylinder 302 positioned inside the axle part 308 may be positioned through a central opening of this separate bearing while the exterior of this separate bearing may be attached to the axle part 308. This bearing may more directly and further facilitate the relative rotation between the first cylinder and the second axle part. Consequently, it may also more directly facilitate relative rotation between the first and second axle parts. Such an embodiment may include the second axle part 308 being positioned at least partially around the first cylinder 302. A first bearing comprising the first ring 310a and the second ring 310b may be positioned between the first 302 and second 304 cylinders, with a second bearing positioned between the first cylinder 302 and the second axle part 308 in place of the fastener 318 and washer 320.

In various embodiments, the first and second cylinders of the rotating component may have a constant width or diameter along the entire lengths of the cylinders. However, in various other embodiments, the cylinders may have a non-uniform width or diameter along their lengths as shown in FIG. 3A. Specifically, the width of a cylinder may be smaller or larger at different parts along its length. For example, a cylinder may have a larger width at one end compared to the other. The change in width along the length of the cylinder may also be gradual or abrupt. Consequently, the cylinders in various embodiments may be tapered at one end. The cylinders may also have widths that differ in different ways along their lengths. For example, a cylinder may start with a width $w_1$ at one of its ends. At some point along its length, the width of the cylinder may change to $w_2$. The width may then return to $w_1$ before changing to $w_3$, before returning back to a width of $w_1$ at the other end of the cylinder. In various embodiments, only one of the cylinders may have a non-uniform width at different points along its length, such as the first cylinder being tapered at one end while the second cylinder retains a uniform width along its length. However, in various other embodiments, both the first and second cylinders may have non-uniform widths along their lengths.

Figure 3B:
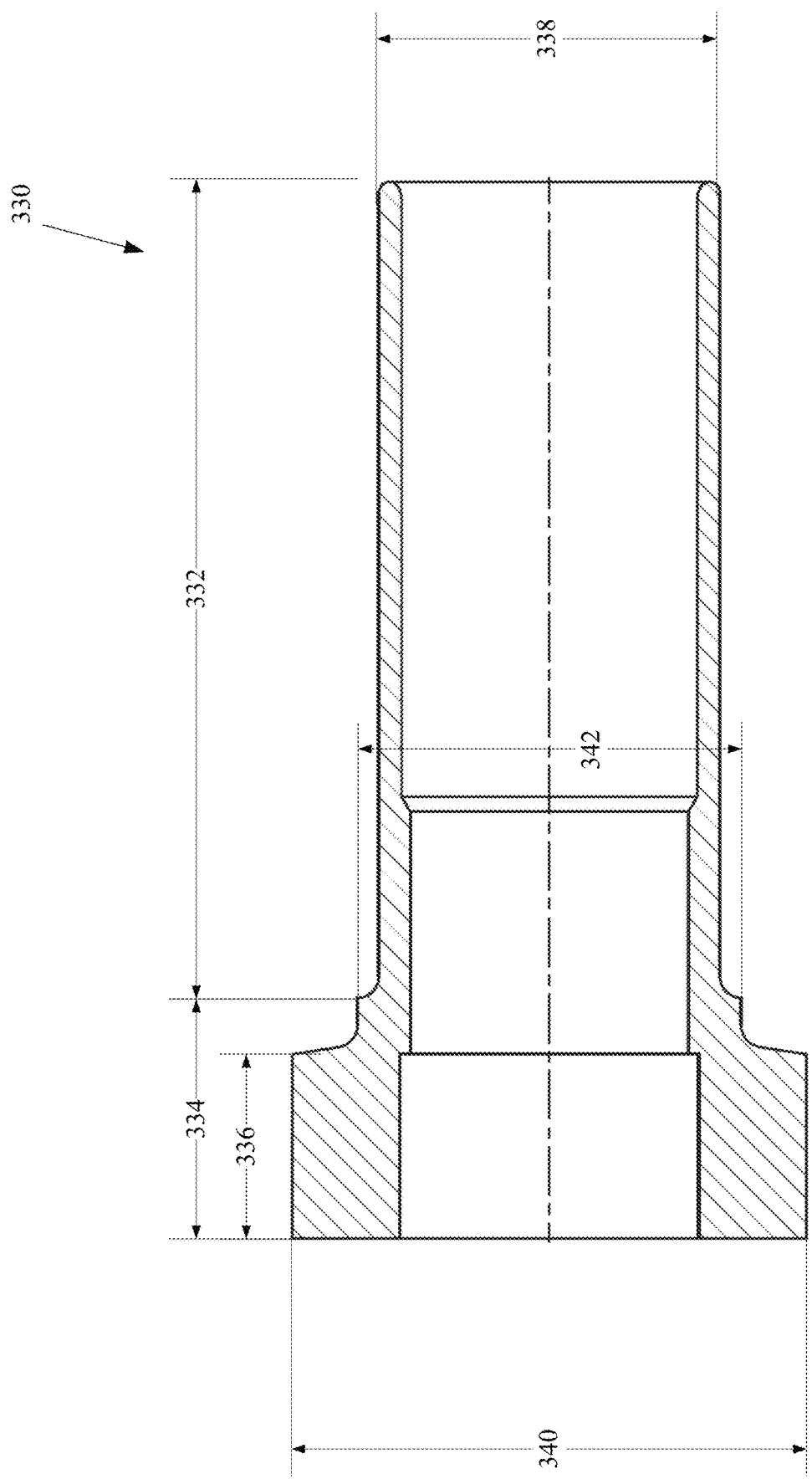
FIG. 3B illustrates a cross-sectional schematic of an exemplary cylinder in a rotating component.

FIG. 3B illustrates a cross-sectional schematic of an exemplary first cylinder 330 that may be positioned inside of a second cylinder, such as 304 of FIG. 3A. As illustrated by the schematic of FIG. 3B, the first cylinder may have a non-uniform width along its length. The first cylinder may have a section 332 of uniform width beginning from the right end before reaching a second section 334 where the width of the first cylinder increases, and a third section 336 where the width increases yet again. As a result, the width 340 of the first cylinder on the left end may be greater than the width 338 on the right end. In various embodiments, the section 332 may also be the section that is positioned inside of a second cylinder, such as 304 of FIG. 2A, whereas the sections 334 and 336 with larger widths may remain outside of the second cylinder. In various embodiments, the first cylinder may have a total length of 242 millimeters (mm). The section 332 may have a length of 195 mm, the section 334 may have a length of 57±1 mm, and section 336 may have a length of 44±1 millimeters. The width 338 of the cylinder on the right end may be 81±0.5 mm, while the width 340 of the cylinder on the left end may be 122 mm. Additionally, the width 342 of the cylinder after the first width increase may be 91±0.5 mm. Although example dimensions are provided for the various sections of the first cylinder 330, it may be noted that other dimensions may also be appropriate depending on the weight of the vehicle that the first cylinder is incorporated into.

Figure 3C:
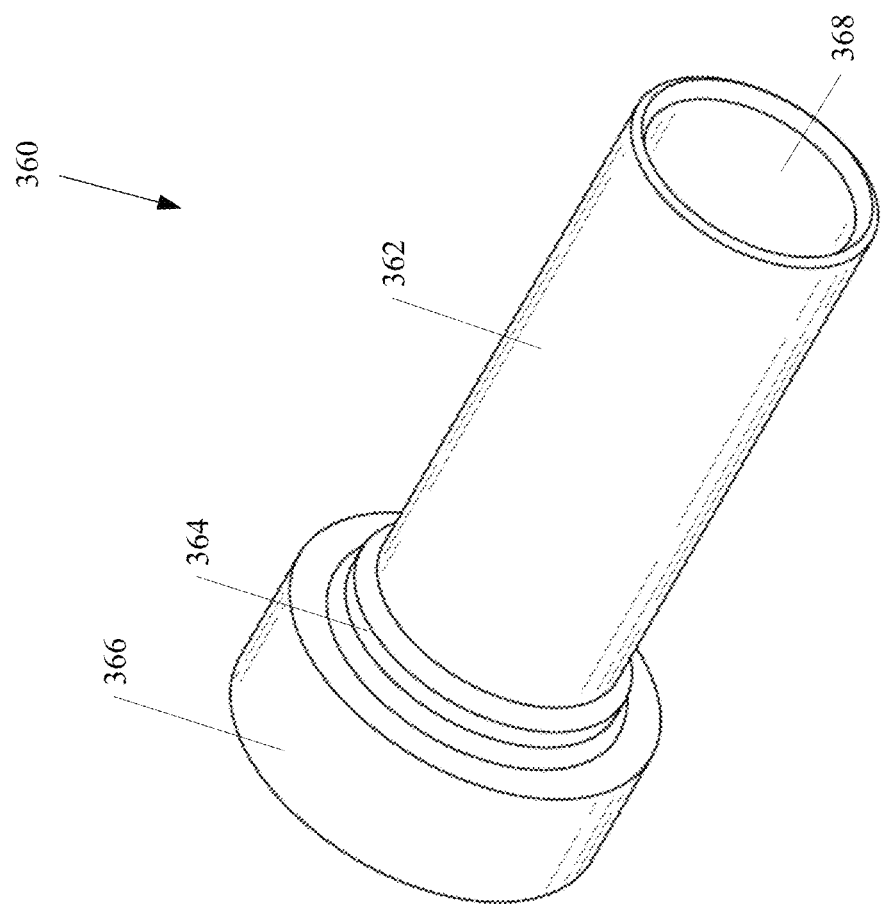
FIG. 3C illustrates a perspective view of an exemplary cylinder in a rotating component.

FIG. 3C illustrates a perspective view of an exemplary first cylinder 360, which may correspond to 320 of FIG. 3B. As illustrated in the figure and described above, the first cylinder may include a first section 362 that may have a first width, a second section 364 that may have a second width greater than the first, and a final section 366 that may have a third width greater than both of the first two widths. In various embodiments, section 362 may correspond to 332 of FIG. 2B, section 364 may correspond to 334 of FIG. 2B, and section 366 may correspond to 336 of FIG. 2B. The exemplary first cylinder 360 may also include an opening 368 on one end, resulting in the first cylinder being hollow along its length. Additionally, as illustrated in FIG. 3C, the exemplary first cylinder 360 may be straight along its entire length without any curved sections, although various embodiments of the first cylinder may have some number of curved sections along its length.

Figure 4A:
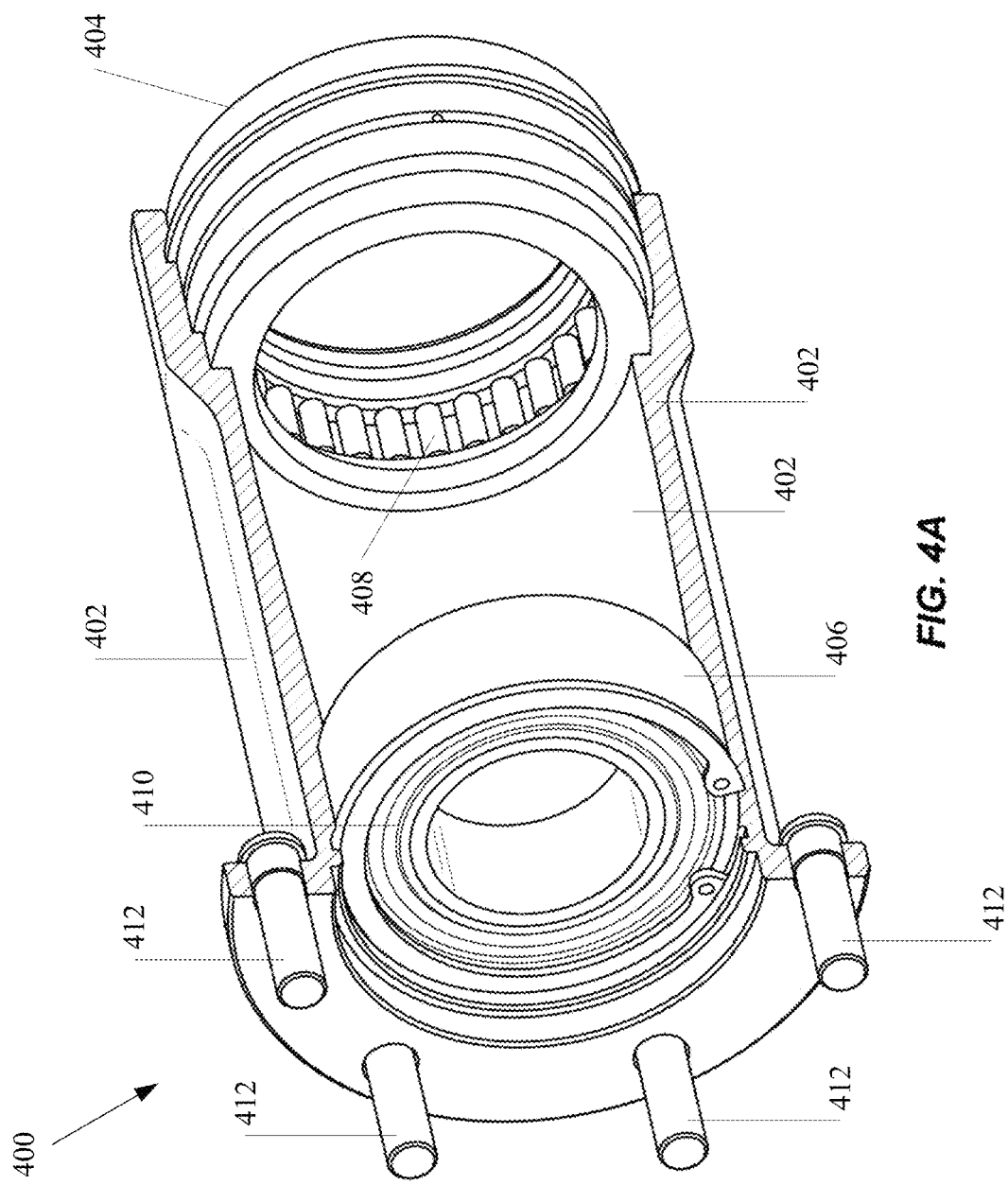
FIG. 4A illustrates a perspective view of an exemplary cylinder and bearings in a rotating component.
Figure 4B:
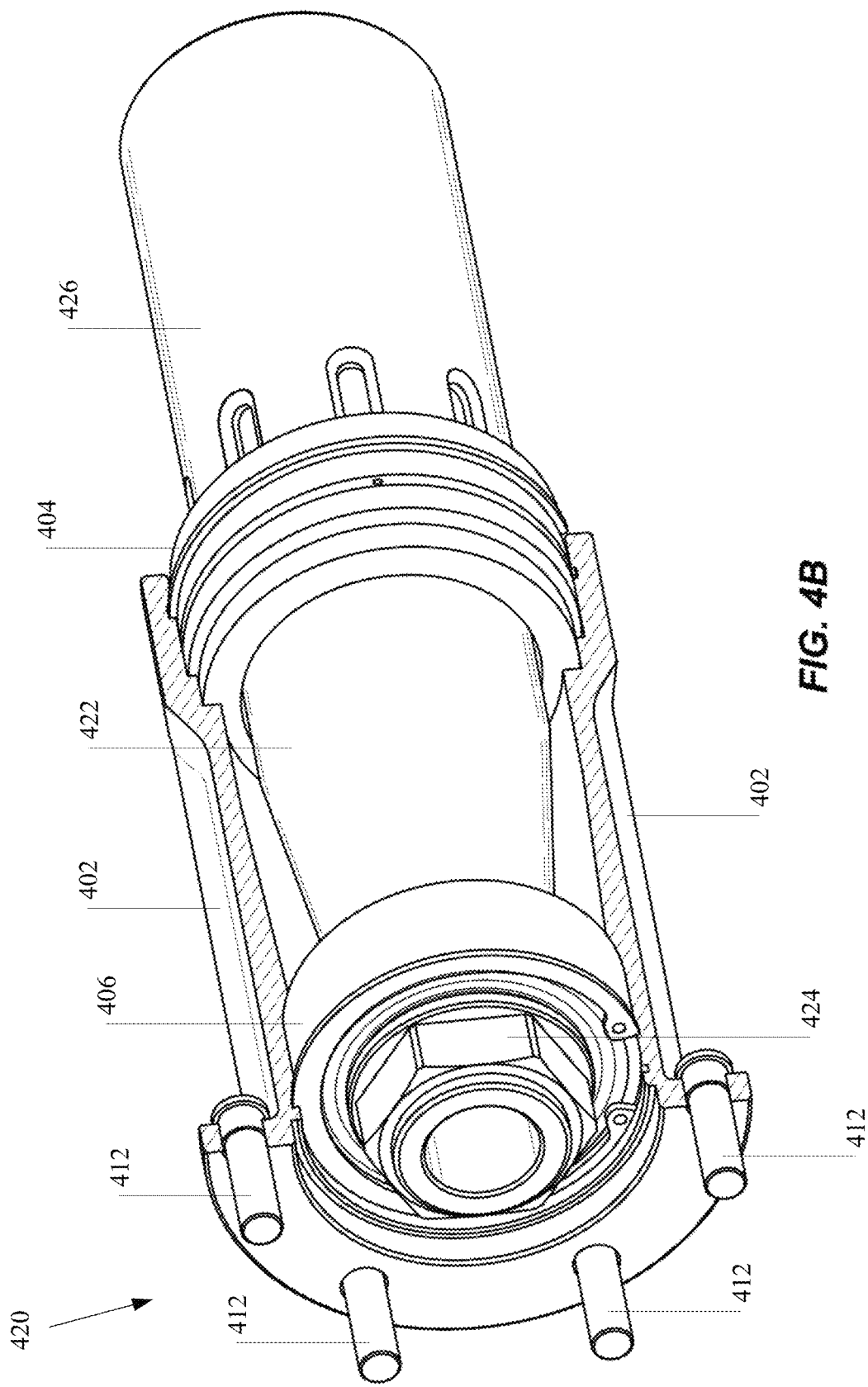
FIG. 4B illustrates a perspective view of an exemplary rotating component with additional components.
Figure 4C:
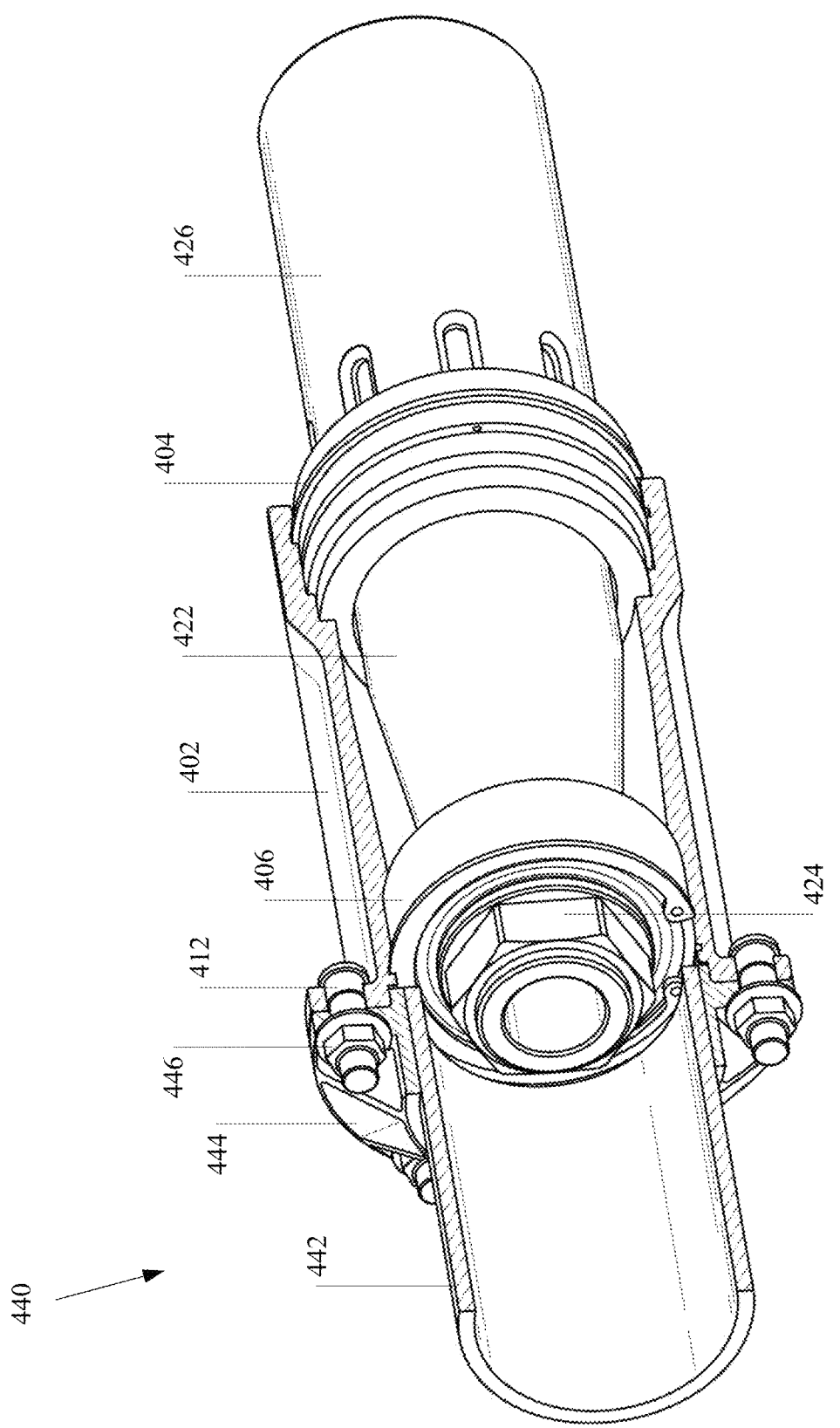
FIG. 4C illustrates a perspective view of an exemplary rotating component when attached to axle parts.

FIG. 4A illustrates a perspective view 400 of a second cylinder and bearings in an exemplary rotating component. As described above with respect to FIG. 2A, the second cylinder 402 may be attached to the exterior of bearings 404 and 406. The bearings 404 and 406 may also be different types of bearings and thus have different structures. For example, the bearing 406 may have a different structure for its rolling element 410 compared to the needle rollers 408 of the other bearing 404. However, even if the bearings have various structural differences, both the bearings may include central openings where the first cylinder of the rotating component may be positioned into. In the figure, the exemplary second cylinder may also include tubular extensions 412 that may be the attachment points used to fixedly attach to an axle part. FIG. 4B illustrates a perspective view 420 of the exemplary rotating component of FIG. 4A with additional components. The rotating component may additionally include a first cylinder 422 that may be positioned at least partially inside of the second cylinder 402. Specifically, the first cylinder 422 may be positioned through the central openings of the bearings 404 and 406. The first cylinder 422 may then be secured by a lock nut 424 to prevent the first cylinder from sliding out of the bearings 404 and 406. Additionally, the first cylinder 422 may be fixedly attached to a first axle part 426. In this exemplary embodiment, the first cylinder 422 may be inserted partially into the first axle part 426, where the first cylinder may be well-fit into the first axle part that the friction prevents the components from sliding apart. In various embodiments, the first cylinder 422 may also be fixedly attached to the first axle part 426 by being welded or bolted together. FIG. 4C illustrates a perspective view 440 of the exemplary rotating component of FIGS. 4A and 4B with the second cylinder 402 fixedly attached to a second axle part 442. In the exemplary rotating component, the second axle part 442 may include a section 444 that includes openings to position around the extensions 412 of the second cylinder 402. The second axle part 442 and second cylinder 402 may then be fixedly attached together by a fastener 446, which may be a bolt or screw and may correspond to 108 of FIG. 1A.

Figure 5:
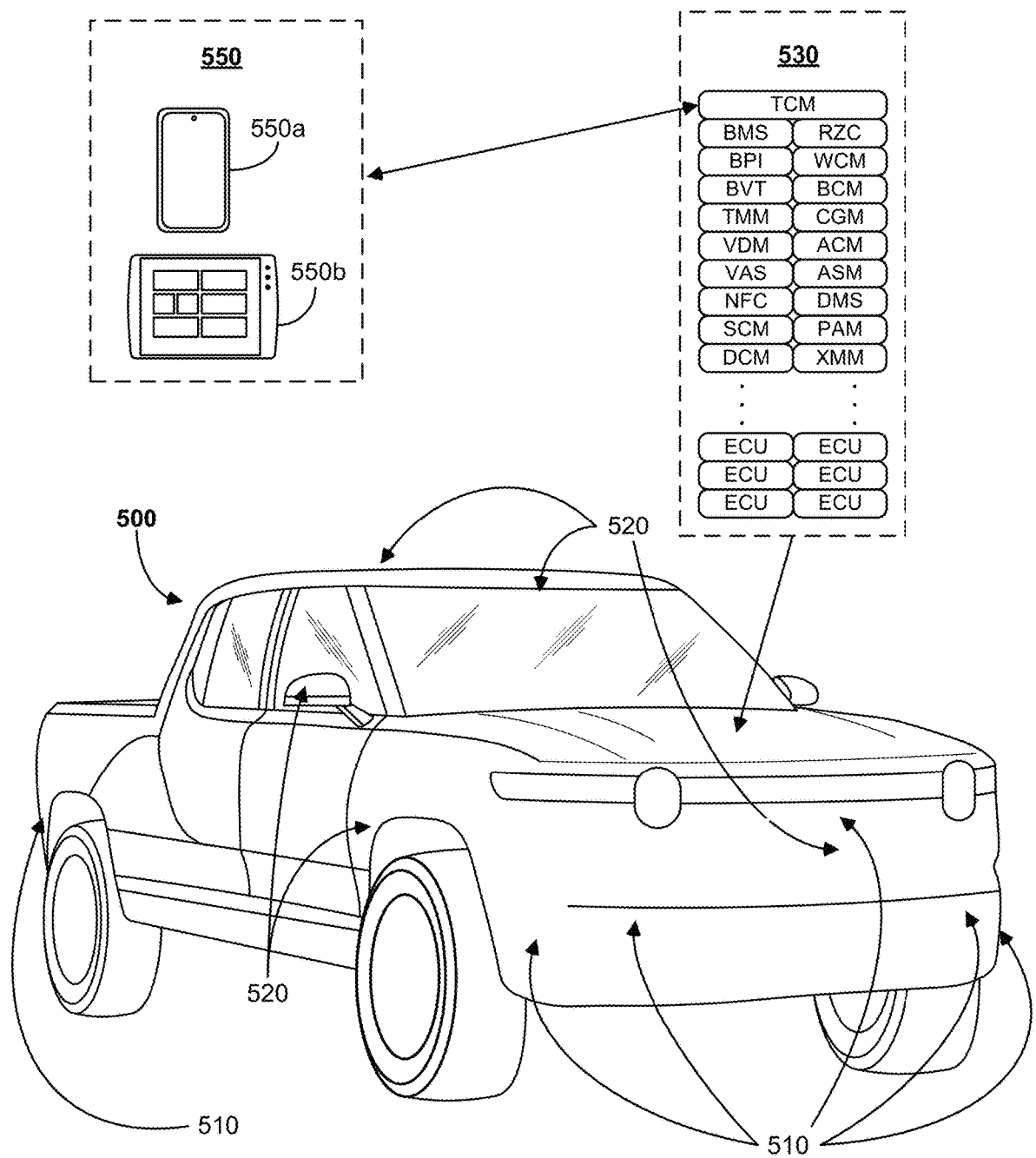
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enable control of various systems on-board the vehicle. As shown in FIG. 5, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Vehicle 500 may include one or more additional ECUs, such as, by way of example and not limitation: a Central Gateway Module (CGM) ECU, a Telematics Control Module (TCM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 500 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figures 6A, 6B:
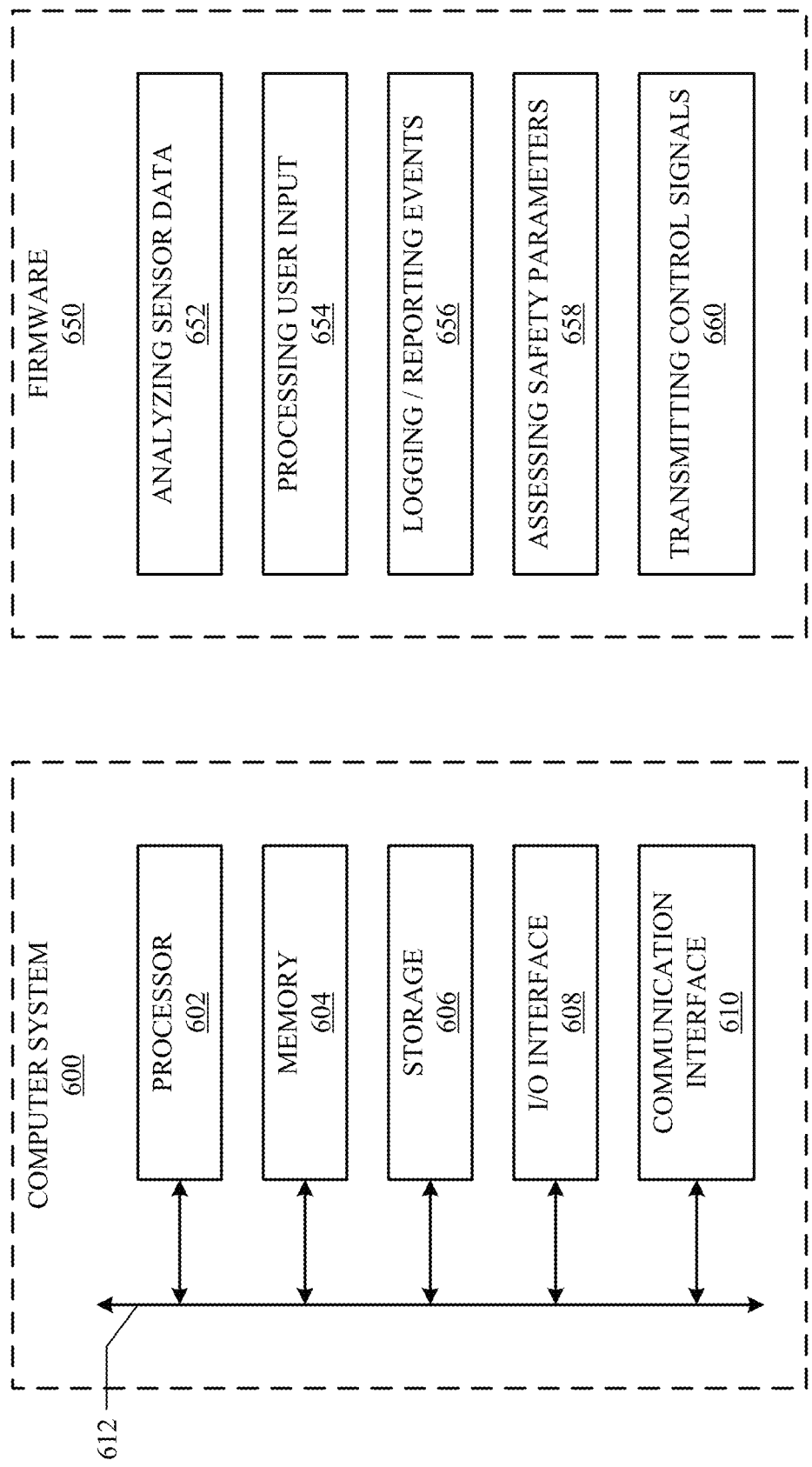
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. Processor 602 may include one or more internal caches for data, instructions, or addresses.

In particular embodiments, memory 604 includes main memory for storing instructions for processor 602 to execute or data for processor 602 to operate on. In particular embodiments, one or more memory management units (MMUs) reside between processor 602 and memory 604 and facilitate accesses to memory 604 requested by processor 602. In particular embodiments, memory 604 includes random access memory (RAM). This disclosure contemplates any suitable RAM.

In particular embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In particular embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In particular embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A vehicle comprising an axle with an apparatus, the apparatus comprising:
    a first cylinder,
    a bearing; and
    a second cylinder positioned around the first cylinder and coaxial with the first cylinder, wherein the bearing is positioned between the first and second cylinders, and wherein the first and second cylinders rotate relatively about an axis and are fixed in a direction of the axis,
    wherein the first cylinder comprises a first attachment point for fixedly attaching to a first axle part, and the second cylinder comprises a second attachment point for fixedly attaching to a second axle part.

2. The apparatus of claim 1, wherein one of the first attachment point and the second attachment point comprises an opening to position a fastener component.

3. The apparatus of claim 1, wherein the first axle part comprises the first cylinder or the second axle part comprises the second cylinder.

4. The apparatus of claim 1, wherein the second axle part is positioned at least partially around the first cylinder, wherein the bearing is positioned between the first and second cylinders, and wherein the apparatus further comprises a second bearing positioned between the first cylinder and the second axle part at a distance from the bearing.

5. The apparatus of claim 1, wherein the first axle part comprises a third attachment point for attaching a first wheel, and wherein the second axle part comprises a fourth attachment point for attaching a second wheel.

6. The apparatus of claim 1, wherein the bearing is positioned between the first and second cylinders, and wherein the apparatus further comprises a second bearing positioned between the first and second cylinders at a distance from the bearing.

7. The apparatus of claim 6, wherein the bearing has a different structure than the second bearing.

8. The apparatus of claim 1, wherein the first cylinder is tapered.

9. The apparatus of claim 1, wherein the bearing comprises a component for facilitating the rotation of the first and second cylinders.

10. A vehicle comprising an axle with an apparatus, the apparatus comprising:
    a first cylinder,
    a bearing; and
    a second cylinder positioned around the first cylinder and coaxial with the first cylinder, wherein the bearing is positioned between the first and second cylinders, and wherein the first and second cylinders rotate relatively about an axis and are fixed in a direction of the axis,
    wherein the bearing comprises a component for facilitating the rotation of the first and second cylinders,
    wherein the bearing comprises a third and fourth cylinder positioned around the component, wherein the third cylinder is attached to the first cylinder and the fourth cylinder is attached to the second cylinder.

11. A suspension system, comprising:
    a first axle part comprising an attachment point on a first end for attaching to a first wheel;
    a second axle part comprising an attachment point on a first end for attaching to a second wheel;
    a first cylinder fixedly attached to a second end of the first axle part, a bearing, a second cylinder positioned around the first cylinder and coaxial with the first cylinder, wherein the bearing is positioned between the first and second cylinders, wherein the first and second cylinders rotate relatively about an axis and are fixed in a direction of the axis, and wherein the second cylinder is fixedly attached to a second end of the second axle part.

12. The suspension system of claim 11, wherein the bearing is positioned between the first and second cylinders, and wherein the suspension system further comprises a second bearing positioned between the first and second cylinders at a distance from the bearing.

13. The suspension system of claim 11, wherein the second axle part is positioned at least partially around the first cylinder, wherein the bearing is positioned between the first and second cylinders, and wherein the suspension system further comprises a second bearing positioned between the first cylinder and the second axle part at a distance from the bearing.

14. The suspension system of claim 13, wherein the bearing has a different structure than the second bearing.

15. The suspension system of claim 11, wherein the first cylinder is tapered.

16. The suspension system of claim 11, wherein the bearing comprises a component for facilitating the rotation of the first and second cylinders.

17. The suspension system of claim 16, wherein the bearing comprises a third cylinder and a fourth cylinder positioned around the component, wherein the third cylinder is attached to the first cylinder and the fourth cylinder is attached to the second cylinder.

18. The suspension system of claim 11, wherein fixedly attaching the first cylinder to the first axle part comprises bolting or welding the first cylinder to the first axle part, and wherein fixedly attaching the second cylinder to the second axle part comprises bolting or welding the second cylinder to the second axle part.

19. The suspension system of claim 11, wherein the first axle part is positioned at least partially around the first cylinder.

* * * * *